(12) United States Patent
Gonzaga (10) Patent No.: US 10,507,698 B2
(45) Date of Patent: Dec. 17, 2019

(54) TIGHTENING GROUP FOR A RIM OF OR FOR A TIRED WHEEL

(71) Applicant: Butler Engineering and Marketing S.p.A., Rolo (Reggio Emilia) (IT)

(72) Inventor: Tullio Gonzaga, Correggio (IT)

(73) Assignee: BUTLER ENGINEERING AND MARKETING S.P.A., Rolo (Reggio Emilia) (IT)

( * ) Notice: Subject to any disclaimer, the term of this patent is extended or adjusted under 35 U.S.C. 154(b) by 189 days.

(21) Appl. No.: 15/845,276

(22) Filed: Dec. 18, 2017

(65) Prior Publication Data

US 2018/0170128 A1    Jun. 21, 2018

(30) Foreign Application Priority Data

Dec. 21, 2016    (IT) .......................... 102016000129591

(51) Int. Cl.
*B60C 25/05*    (2006.01)
*B60B 30/06*    (2006.01)
*B60C 25/132*   (2006.01)
*B60C 25/138*   (2006.01)

(52) U.S. Cl.
CPC .......... *B60C 25/0539* (2013.01); *B60B 30/06* (2013.01); *B60C 25/0545* (2013.01); *B60C 25/132* (2013.01); *B60C 25/138* (2013.01)

(58) Field of Classification Search
CPC ... B60C 25/132; B60C 25/135; B60C 25/138; B60C 25/0545; B60C 25/0539
See application file for complete search history.

(56) References Cited

U.S. PATENT DOCUMENTS

| 3,493,030 | A  | * | 2/1970 | White .................... B60C 25/132 |
| | | | | 157/1.24 |
| 4,750,538 | A  | * | 6/1988 | du Quesne .............. B60B 30/06 |
| | | | | 157/1.24 |
| 7,201,204 | B2 | * | 4/2007 | Corghi ................ B60C 25/0545 |
| | | | | 157/16 |
| 7,708,045 | B2 | * | 5/2010 | Bonacini ............. B60C 25/0545 |
| | | | | 157/16 |
| 9,114,672 | B2 | * | 8/2015 | Bonacini ............. B60C 25/0545 |
| 9,254,722 | B2 | * | 2/2016 | Gonzaga ................. B60C 25/01 |
| 2013/0146231 | A1 | * | 6/2013 | Bonacini ............... B60C 25/135 |
| | | | | 157/1.24 |

FOREIGN PATENT DOCUMENTS

| CN | 201970803 | 9/2011 |
| CN | 202053831 | 11/2011 |
| EP | 1518718 | 3/2005 |
| WO | 2004/050393 | 6/2004 |

OTHER PUBLICATIONS

Search Report for IT201600129591 dated Aug. 11, 2017 (7 pages).

* cited by examiner

*Primary Examiner* — David B. Thomas
(74) *Attorney, Agent, or Firm* — Tutunjian & Bitetto, P.C.

(57) ABSTRACT

The present invention regards a tightening group for a rim of or for a tired wheel including a base, a main wheel-holder or rim-holder plate or table and at least three jaws or jaw or gripper components.

16 Claims, 7 Drawing Sheets

TIGHTENING GROUP FOR A RIM OF OR FOR A TIRED WHEEL

TECHNICAL FIELD OF THE INVENTION

The present invention regards a tightening group for a rim of or for a tired wheel, for example for a tire mounting-demounting machine or a tired wheel treatment machine.

STATE OF THE ART

The groups for tightening rims or self-centering groups of tire mounting-demounting machines proposed up to now comprise a rotatable platform provided with four locking jaws, which grasp the rim along a zone concentric to the rotation axis thereof.

Usually—see for example the European patent application published at number EP1518718A1—such jaws are driven by pneumatic actuators and their movement is synchronized by means of a device with rods and rotary plate or by racks with a central gear.

There are one or two actuators connected between two diametrically opposed jaws, which are termed driving jaws. The other two jaws, which are angularly offset by 90° degrees with respect to the driving jaws, are moved by means of a synchronizer device and are defined driven jaws.

Due to the clearances and frictions of the synchronizer device, the two driven jaws tighten the rim with less force than the driving jaws and in a manner that is not symmetrical to the latter, so as to determine an off-center tightening of the rim and of a respective wheel.

In addition, the travel of the actuators necessary for locking large-size rims is quite considerable, so that the actuators are very bulky in extended position, extending beyond the diameter of the platform and determining projecting points that are dangerous for the operator, especially during the rotation of the platform.

CN202053831U, CN201970803U and WO2004050393A1 teach solutions according to the state of the art.

SUMMARY OF THE INVENTION

One object of the present invention is to provide a new tightening group for a rim of or for a tired wheel.

Another object of the present invention is to provide a new group as stated above which is mechanically simple.

Another object of the present invention is to provide a new tightening group which is reliable and inexpensive.

Another object of the present invention is to provide a new group as indicated above which can be used with rims with diameter very different from each other.

Another object of the present invention is to provide a new machine for mounting and/or demounting a tire on/from a rim.

In accordance with one aspect of the invention, a group is provided according to the present specification.

The present specification refers to preferred and advantageous embodiments of the invention.

BRIEF DESCRIPTION OF THE DRAWINGS

Other characteristics and advantages of the invention will be more evident from the description of embodiments of a group, illustrated by way of example in the enclosed drawings in which.

In the set of drawings, equivalent parts or components have been marked with the same reference numbers.

DETAILED DESCRIPTION OF THE INVENTION

With reference first to FIGS. 1 to 8, a tightening group 1 is illustrated according to the present invention for a rim of or for a tired wheel, in particular a group of or associable with a machine for treating tired wheels (see FIG. 14), such as a tire mounting-demounting machine. Such group includes a base 2 (not illustrated in FIGS. 1 to 8, but visible for example in FIG. 14) and a main wheel-holder or rim-holder plate or table 3. Such table 3 is supported by the base and defines at least three slide tracks or guides 4, in particular substantially rectilinear, four slide tracks or guides 4 according to the embodiment illustrated in the figures. The main plate or table 3 also defines a first surface 3a, directed upward during use, for the abutment of a rim.

Figure 1:
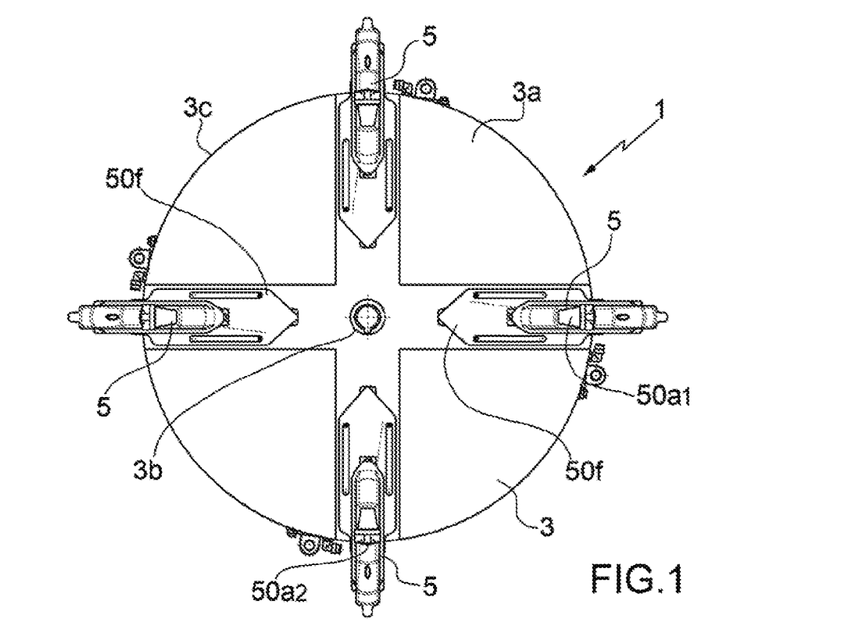
FIGS. 1 and 2 are plan views of a group according to the present invention with jaws respectively open and closed.
Figure 2:
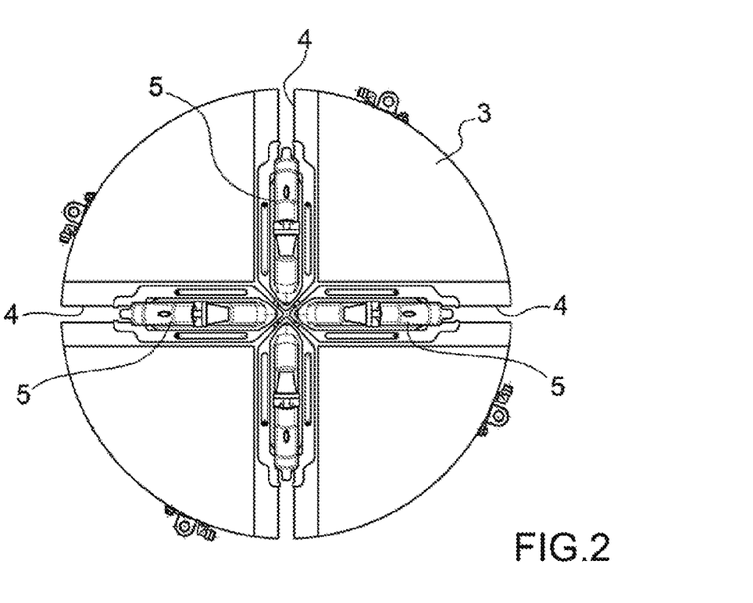
Figure 3:
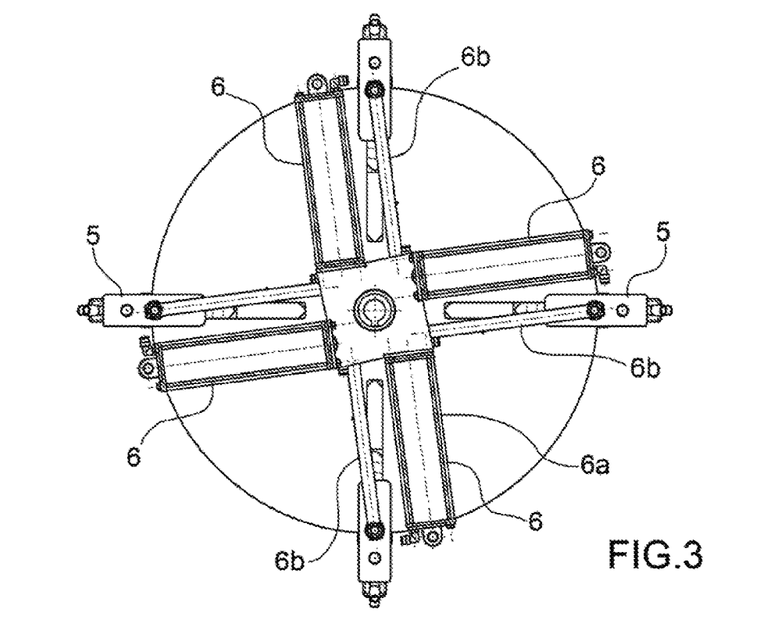
FIGS. 3 and 4 are bottom views of the group of FIG. 1 with jaws respectively open and closed.
Figure 4:
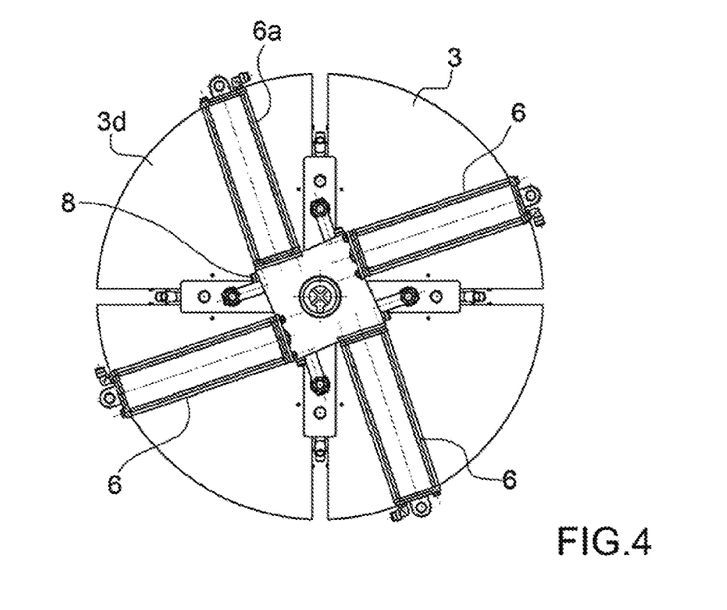
Figure 5:
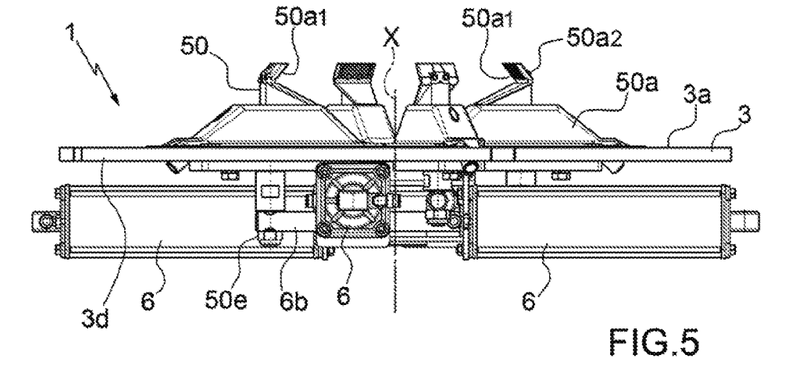
FIGS. 5 and 6 are side views of the group of FIG. 1.
Figure 6:
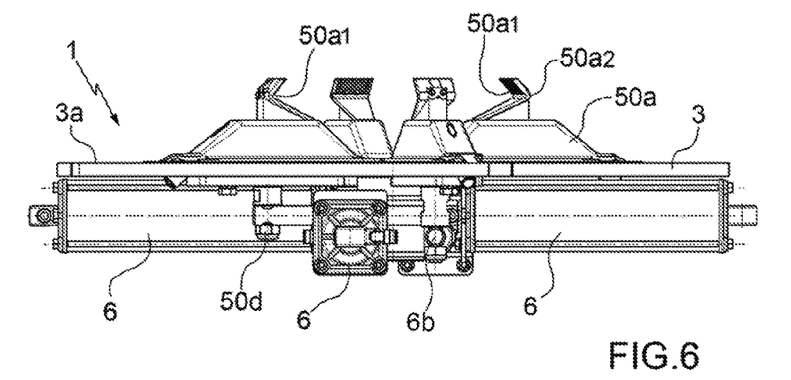
Figure 7:
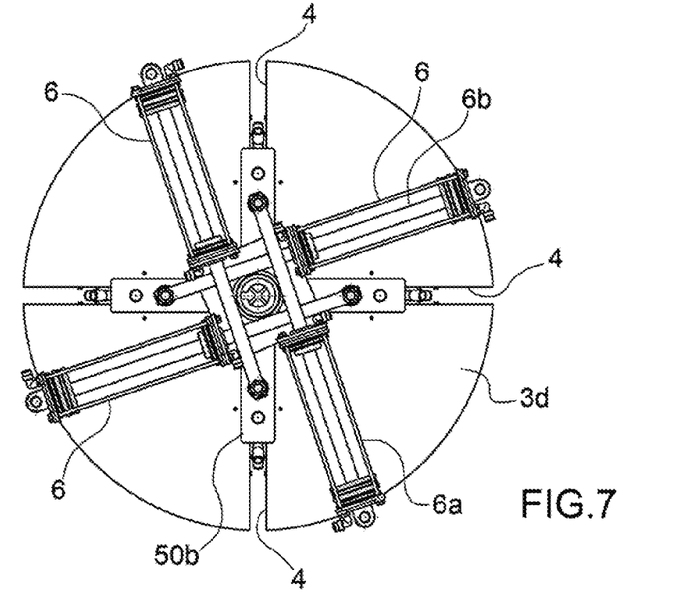
FIG. 7 is a bottom view of the group of FIG. 1 with transparent parts.
Figure 8:
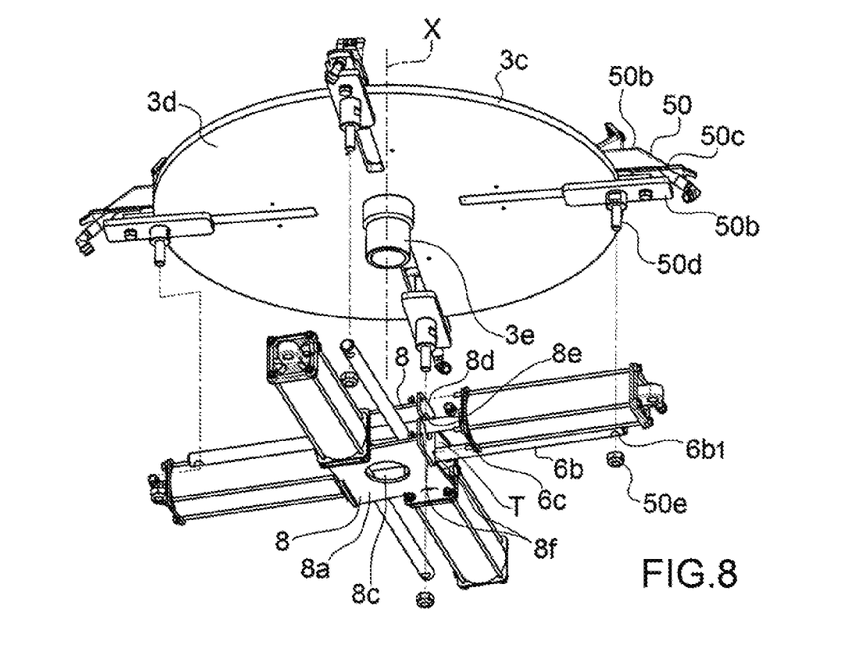
FIG. 8 is an exploded view of the group of FIG. 1.

The group 1 then comprises at least three jaws or jaw or gripper components 5 (four according to the embodiment illustrated in the figures), each slidably mounted in a respective slide track or guide 4 between at least one first approached position (see FIG. 2 or 4) and at least one second moved-apart position (see FIG. 1 or 3). The jaw components 5 are set to tighten, in particular to simultaneously tighten, a respective portion of a rim of or for a tired wheel in the first approached position and/or in the second moved-apart position.

More particularly, the jaw components 5 are set to tighten, in particular to simultaneously tighten, a respective portion of a rim, when—after the rim has been mounted on the table 3—the jaw components 5 are moved into a first approached position and/or into a second moved-apart position.

Clearly, the jaw components 5 project upward starting from the table 3, or better yet astride the table 3 so as to project upward from the same with a respective engagement portion.

More particularly, in the first approached position, the jaw components 5 are moved close to each other and into a position proximal to the center 3b or central axis x-x of the table 3 and distal from the external edge 3c thereof, while in the second moved-apart position the jaw components 5 are moved away from each other and into a position distal from the center 3b of the table 3 and proximal to or at the external edge 3c thereof.

Clearly, without a rim present, the jaw components 5 are movable between a first terminal or end position, in which the jaw components 5 are in the position as close as possible to the center 3b of the table 3 and a second terminal position in which the jaw components 5 are in the position as far as possible from the center 3b of the table 3. However, in the presence of a rim to be tightened, if the jaw components 5 are set to engage a rim with a respective internal engagement portion, i.e. closer to the center 3b of the table 3 with respect to an external portion of the jaw components 5 themselves, then the first position is a function of the size of the rim, while if the jaw components 5 are set to engage a rim with a respective external engagement portion or directed outward, then the second position is a function of the size of the rim.

The group 1 also comprises at least three actuators 6, for example three or four actuators 6 or in any case one actuator for each jaw component 5, each constrained or pivoted to a respective jaw component 5 and set to move it between the first and the second position. Due to such expedient, all the jaws 5 are driving and none are driven, so that they can all apply—in particular simultaneously as will be better explained hereinbelow—the same tightening force to a rim mounted on the table 3.

One or more of the actuators 6 can comprise a cylinder 6a as well as a stem 6b slidably mounted within the respective cylinder 6a.

The actuators 6 can be of pneumatic, electric, hydraulic or oil-pressure type, if desired double-acting.

Preferably, the group 1 then comprises means for synchronizing the movement of the jaw components 5 set to always maintain the jaw components 5 at a same distance with respect to the center 3b of the table 3, such that the jaw components 5 apply the same tightening force to a respective portion of a rim mounted on the table 3. Advantageously, the actuators 6 can be angularly moved with respect to the table 3 and the synchronization means synchronize the angular movement of the actuators 6 with respect to the table 3.

On such matter, by driving the actuators 6, the jaw components 5 are moved into the first approached position and/or into the second moved-apart position and the actuators 6 undergo an angular movement, in particular they all undergo the same angular movement, usually between 5° and 40°, e.g. between 5° and 30°, if desired between 5° and 10° or between 10° and 20°.

If desired, the synchronization means are set to maintain all the actuators 6 always at the same angular position with respect to each other during the movement—by the actuators 6 themselves—of the jaw components 5 between the first and second position, such that the jaw components 5 are always at a same distance with respect to the center 3b of the table 3 and hence they apply the same tightening force to a respective portion of a rim mounted on the table 3 of the group 1.

The actuators 6 as well as the synchronization means are preferably housed below the table 3.

The synchronization means can comprise a frame 8 pivoted to the table 3 or to a support upright thereof, while the actuators 6 are fixed, i.e. rigidly constrained and not movable, e.g. welded or glued, to the frame 8. In such case, the frame 8 can be pivoted to the table 3, e.g. centrally thereto.

If the actuators 6 each comprise a cylinder 6a as well as a stem 6b slidably mounted within the respective cylinder 6a, the cylinders 6a or the stems of the actuators 6 can be cantileverly supported by the frame 8. In such case, the stems 6b or the cylinders 6a of the actuators 6 can be rotatably connected or pivoted on the lower part to a respective jaw component 5.

Moreover, the cylinder 6a of an actuator 6 can be extended or pivoted or angularly movable in the zone below the table 3 between two jaws 5, while the stem 6b of such actuator is pivoted to a jaw 5 or jaw-holder slide different from the two jaws that delimit the zone of positioning and articulation of the respective cylinder 6a.

If desired, each actuator 6 or better yet the respective stem 6b is aligned along a direction that does not pass through the symmetry axis x-x of the table 3, for example each actuator 6 and hence the cylinder 6a and the stem 6b thereof are extended along a chord (variable during the angular movement of the respective actuator) of a circle with center lying in the symmetry axis x-x and, for example, diameter corresponding to the table 3, if the latter has circular external edge 3c.

In addition, the actuators 6 or better yet the respective stem 6b can be tilted or angularly spaced with respect to the extension of the guide 4 in which the respective jaw component 5 is slidably mounted; for such purpose, the angle delimited between the extension or expansion-retraction direction of a stem and the extension direction of the guide 4 in which the respective jaw component 5 is slidably mounted varies during operation considering that, as will be stated hereinbelow, the actuators 6 undergo an angular movement during the movement of the jaw components 5.

According to the non-limiting embodiment illustrated in the figures, each jaw 5 comprises a main slide body 50 having an upper portion 50a defining the engagement surface(s) 50a1, 50a2 of an edge portion of a rim as well as a lower portion 50b delimiting lateral grooves 50c for the engagement of sections of the table 3, e.g. sections for delimiting slots of the slide guides 4.

If desired, starting from a surface, lower during use, of the lower portion 50b, a pin or first pin 50d is extended that is set to be inserted and rotatably constrained or pivoted, e.g. by means of a bolt 50e, in a hole 6b1 made in a respective stem 6b, for example at the tip thereof, or at a respective cylinder 6a.

Moreover, the upper portion 50a of the main slide body 50 could comprise one or two engagement surfaces 50a1, 50a2.

On such matter, according to the non-limiting embodiment illustrated in the figures, the upper portion 50a of the main slide body 50 of one or more of the jaw components 5 delimits a first engagement surface 50a1 directed towards the center 3b of the table 3 and a second engagement surface 50a2 directed towards the external edge 3c of the table 3.

With regard to such aspect, the upper portion 50a could comprise a curved or L-shaped section delimiting a substantially concave zone, with concavity directed towards the center 3b of the table 3 and defining the first engagement surface 50a1, and a convex zone with convexity directed away from the center 3b and defining the second engagement surface 50a2.

In addition, small plates or mask elements 50f can also be provided between each main slide body 50 and the table 3, which are slidably mounted on the table 3 and set to at least partly obstruct the guides 4, to prevent an operator from inadvertently inserting a hand therein. Clearly, the small plates 50f slide without preventing the sliding of the jaw components 5 on the guide 4.

As will be understood, by extending or contracting the stems 6b relative to the respective cylinders 6a, the opening and closing of the jaw components 5 is determined, i.e. the same moving away from or closer to the center 3b of the table 3. During such opening or closing travel, the actuators 6 can rotate by several degrees around the center 3b of the platform, but are maintained at the same angular distance by means of the synchronization means, such that the jaw components 5 are synchronized in the movement thereof.

On such matter, the group 1 or a machine comprising such group is also provided with means for simultaneously feeding or for feeding substantially all the actuators 6, substantially in the same manner, such that the respective jaws are substantially moved for the same distance, even if the synchronization means ensure possible differences of movement between the jaw components 5. Such means for example could comprise a single manifold in fluid communication with the actuators, if desired in communication with both ends of each actuator with interposition of suitable valves for suitably driving the actuators during the tightening or release of a rim.

More particularly, according to the embodiment illustrated in the figures, the frame 8 comprises one or a pair of plates 8a, 8b, e.g. spaced so as to delimit a passage tunnel T for the stems 6b of the actuators 6. The plates 8a, 8b can have trim substantially parallel to the table 3.

Moreover, both plates 8a, 8b can delimit a main hole 8c for the insertion of a shank 3e projecting downward from the table 3 and set to engage or be constrained to an upright projecting upward from the base 2.

The frame 8 then comprises means for constraining the actuators 6 to the plate(s) 8a, 8b, for example brackets 8d, if desired C-shaped or in any case delimiting a hollow hole 8e for the passage of a stem 6b; such brackets 8d are fixed to the plate(s) 8a, 8b by means of welding, glue or equivalent means. The brackets 8d also delimit openings 8f for the connection, e.g. to size, of small pins 6c integral with a respective cylinder 6a.

In addition, the plates 8a, 8b can have square or rectangular configuration, in particular if four jaws 5 and four actuators 6 are provided for in the group 1, or they can have a number of external sides corresponding to the number of jaws 5 and actuators 6. For such purpose, each actuator 6 is constrained at a respective side of the plates 8a, 8b.

Preferably, a group according to the present invention comprises three jaw components 5 slidably mounted in slide tracks or guides 4 angularly spaced by about 120° with respect to each other and, if desired, three actuators 6 angularly spaced by about 120° with respect to each other, or four jaw components 5 slidably mounted in slide tracks or guides 4 angularly spaced by about 90° with respect to each other and, if desired, four actuators 6 angularly spaced by about 90° with respect to each other.

Advantageously, in a group 1 according to the present invention, the actuators 6 are pivoted or angularly movable with respect to the table 3 and they do not project with respect to the planar bulk of the latter or in any case the part of the actuators 6 projecting with respect to the planar bulk of the table 3 does not increase in the passage of the jaw components 5 between the first approached position and the second moved-apart position.

Preferably, at least one actuator 6 is at a level or distance from the table 3 different from that of one or more of the other actuators 6. More particularly, if each of the actuators 6 comprises a cylinder 6a as well as a stem 6b slidably mounted within the respective cylinder 6a, at least two stems 6b of two respective actuators 6 are staggered vertically or in any case according to a direction orthogonal to the main extension plane of the table 3, but crossed with reference to a plan view, i.e. the vertical plane—where the extension direction of one of the stems lies—intercepts the other of the two stems in a manner such that the two stems can actually slide one over the other, in cross direction with respect to each other.

On such matter, if four actuators are provided, the same or better yet the respective stems are intersected by about 90° with respect to the adjacent ones, so that opposite actuators are set to act along parallel directions, or if three actuators are provided, the same or better yet the respective stems are intersected by about 120° with respect to the adjacent ones.

According to the non-limiting embodiment illustrated in the figures, the table 3 comprises a solid of revolution around a symmetry axis x-x. Such solid of revolution is configured as a substantially flat discoid element, while the slide tracks or guides are defined by through slots 4 formed in the substantially discoid element 3 and are extended for example starting from the external edge 3c of the discoid element along lines belonging to the bundle of lines with center in the symmetry axis x-x of the substantially discoid element 3. In such case, the angular distance between two adjacent slots 4 is preferably the same, e.g. 120° or 90°, for all the pairs of adjacent guides defined on the table 3.

With reference to FIGS. 9 to 13, groups are illustrated according to the present invention that are similar to that described above, but whose synchronization means comprise connection means and the cylinders 6a or the stems 6b of the actuators 6 are pivoted to the table, while the stems 6b or the cylinders 6a of the actuators 6 are constrained to each other by means of the connection means.

Figure 9:
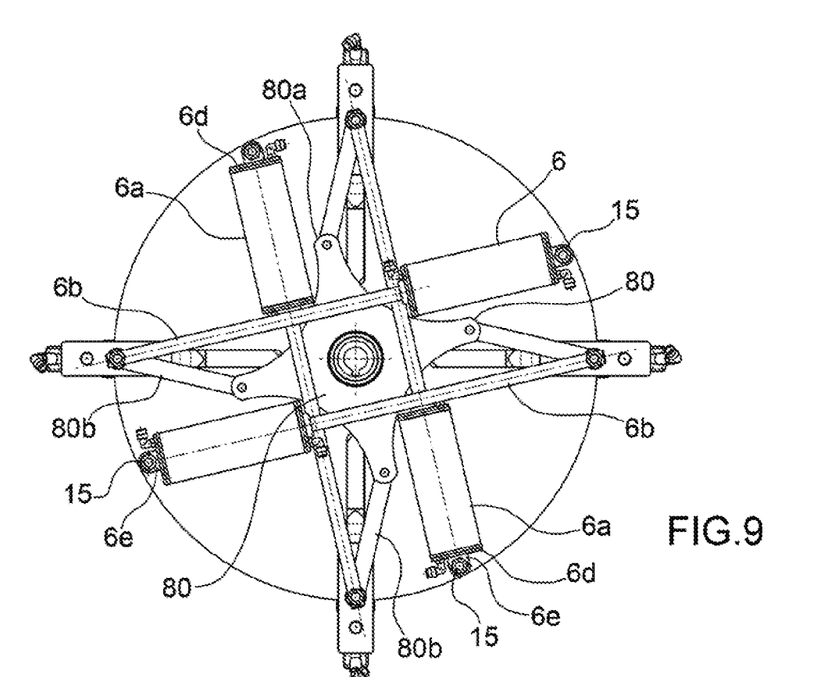
FIGS. 9 and 10 are bottom views of another embodiment of a group in accordance with the present invention, with jaws respectively open and closed.
Figure 10:
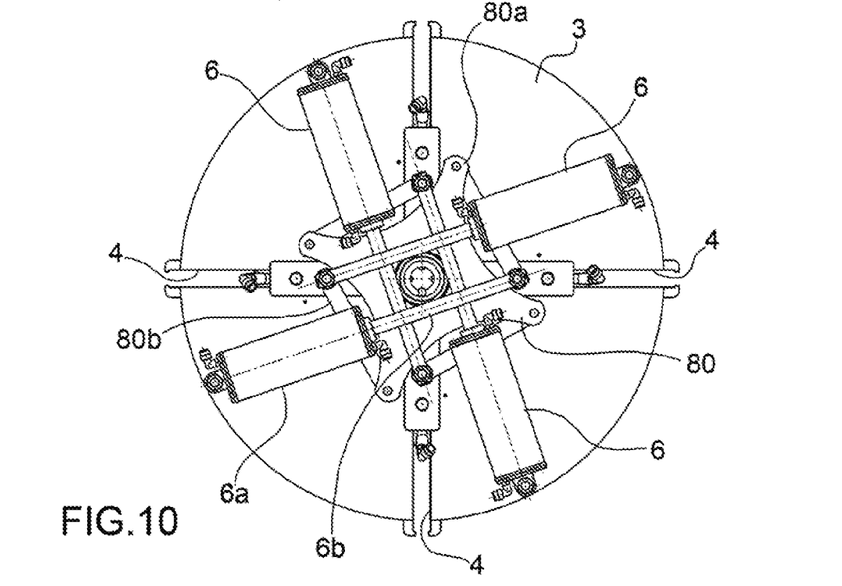

In accordance with the non-limiting embodiment illustrated in FIGS. 9 and 10, the cylinders 6a of the actuators 6 are pivoted to the table 3, while the synchronization of the movement of the jaws is obtained with connection means 80 including a main connection component 80a as well as rod components 80b, set to kinematically connect the main connection component 80a and the stems 6b, for example a respective rod component 80b between the main connection component 80b and each stem 6b.

On such matter, the rod components 80b can be pivoted to the stems 6b at the same pin for pivoting the stems 6b to the jaw components 5 or at another pin.

The cylinders 6a can instead be pivoted by means of a second pin 15 to the table 3 at an end opposite that of insertion/extraction of the stems 6b, for example at a flange 6d constrained at such end or better yet in a hole formed in an appendage 6e projecting upward from such flange 6d.

With regard to the main connection component 80a, the same can comprise a sheet, e.g. configured as a cross or square or rectangle or rhombus or polygon with another shape, and have symmetry axis x-x coinciding with the axis of the table 3. The stems 6b are pivoted to the main connection component 80a, each at a respective section, for example if the main connection component 80a is configured as a cross or square or rectangle or rhombus or polygon, each stem 6b can be pivoted at a respective corner or projecting section of the main connection component 80a.

Figure 11:
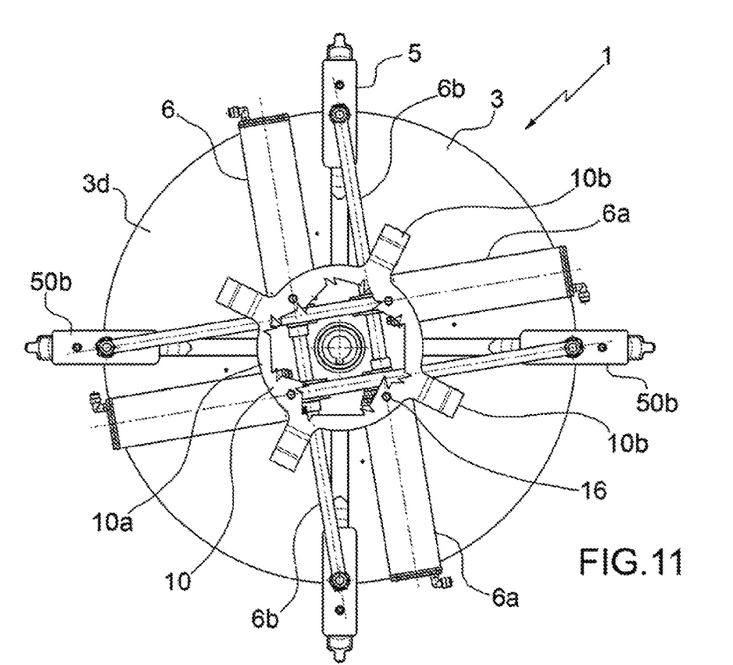
FIGS. 11 and 12 are bottom views with parts removed of another group in accordance with the present invention, with jaws respectively open and closed.
Figure 12:
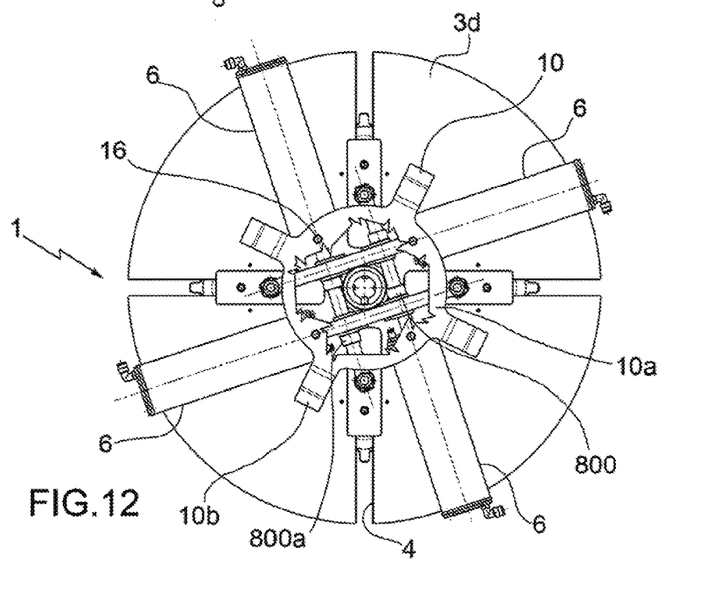
Figures 13, 14:
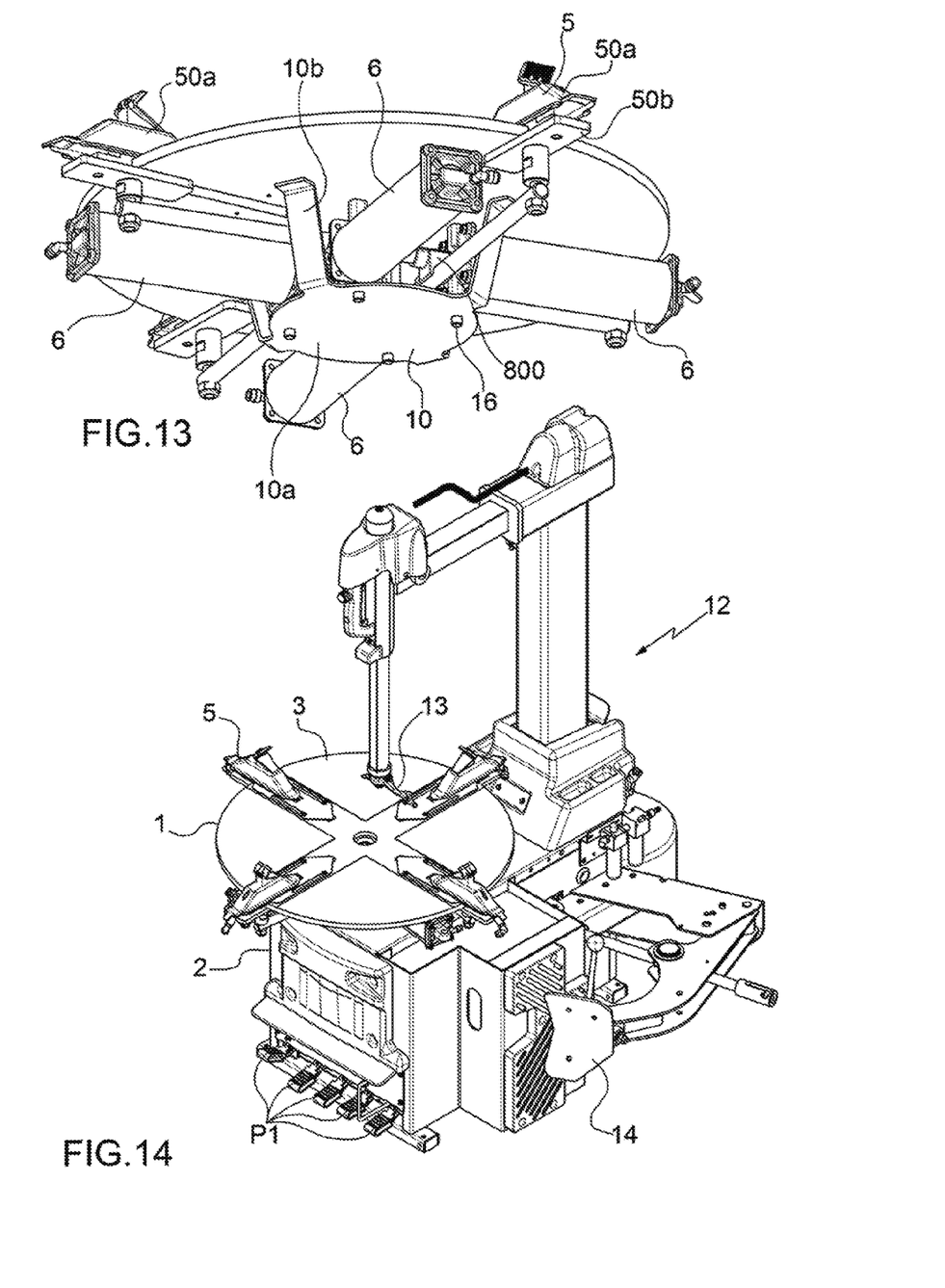
FIG. 13 is a slightly bottom perspective view of the group of FIG. 11.
FIG. 14 is a view of a machine for treating tired wheels according to the present invention.

In accordance instead with the non-limiting embodiment illustrated in FIGS. 11, 12 and 13, the cylinders 6a of the actuators 6 are pivoted to the table 3, each by means of a respective third pin 16, while the synchronization of the movement of the jaws 5 is obtained with connection means comprising fork components 800 or mechanical fixing components between the stems 6b or between the cylinders 6a of the actuators 6. If desired, the fork components 800 or fixing components are set for constraining, two-by-two together, the stems 6b or the cylinders 6a or at least two stems 6b or cylinders 6a, i.e. constraining or fixing the angular distance of the stems or of the cylinders.

More particularly, the fork components 800 can comprise a block 800a delimiting a first seat for the guided housing of a first stem 6b as well as a second seat for the guided sliding of another or second stem 6b that is tilted with respect to the first stem 6b, e.g. by 120° if three actuators 6 and three jaws 5 are provided for or 90° if four actuators 6 and four jaws 5 are provided for.

In such case, the cylinders 6a can be pivoted to the table 3 at the end of insertion/extraction of the stems 6b.

In addition, one such group could comprise a bracket 10 set to support—from below—the actuators 6 or better yet the cylinders 6a of the actuators 6. Such bracket 10 is in turn constrained or fixed, if desired by means of welding, screws or bolts, to the table 3. The bracket 10 can for such purpose comprise a first base portion 10a, if desired a substantially flat plate, as well as two or more (four according to the embodiment in the figures) projecting or spline-like components 10b extended from the plate and constrained or fixed or welded to the table 3, more particularly at a second surface 3d that is directed downward during use.

In such case, the cylinders 6a are preferably pivoted by means of a same pin both to the table 3 and to the bracket 10, in particular to the base portion 10a thereof.

A group according to the present invention, in particular the table or wheel-holder table 3, can be motorized by means of an electric or pneumatic motor, or motor of another type, and rotatable so as to be able to drive in rotation a rim or a tired wheel mounted thereon and tightened by the jaw components around a rotation axis, which during use corresponds to the rotation and symmetry axis of the rim W. Alternatively, the table could be fixed, and in such case one or more tire mounting-demounting or treatment units or better yet the base thereof could be rotatable or mounted on wheels, such that it is possible to drive such unit around the rim or the wheel mounted on the tightening group or better yet on the table thereof.

Moreover, the table 3 could be movable, e.g. liftable—lowerable and/or horizontally translatable. This could be useful for moving the table vertically and/or horizontally closer to or away from work or treatment tools of a machine for treating tired wheels, comprising the group according to the present invention or which is associated with such group.

Also forming the object of the present patent application is a tire mounting-demounting machine 12 (see FIG. 14) provided with a tightening group 1 as described above. The machine in such case also comprises one or more work or treatment tools 13, 14 for the tired wheels to be mounted, demounted and/or worked, e.g. tired wheel mounting tools, tired wheels demounting tools or bead-breaking tools.

Alternatively, the group could be separated from the other tools or better yet not be part of the same machine as the latter; in such case, the group could be supported by a base thereof and, if necessary, associated with or fit with columns or treatment units equipped with suitable tools, for example as indicated above.

Clearly, the group or the machine comprising the same is also provided with means for driving the actuators 6 or valves set to intercept the fluid communication between cylinders of the actuators and a pressurized fluid manifold, as well as possible tools of the machine, e.g. pedals P1 or the like.

With a group and a machine according to the present invention, after having arranged a rim or a tired wheel on the table 3, the actuators 6 are driven so as to move the jaw components 5 in a manner such to tighten the rim—from the interior or from the exterior—and thus constrain it to the group itself.

As will be understood, in a group according to the present invention all the jaws are driving, so that the force applied to a rim to be tightened is identical as well as precisely centered.

In addition, such group is very simple to achieve.

Moreover, with a group according to the present invention it is possible to use actuators smaller than the actuators currently used on the self-centering groups, which involves a smaller size of the actuators during use and less risk for the operators.

Embodiments and variations of the invention are possible within the protective scope defined by the claims.

The invention claimed is:

1. A group for tightening a rim of or for a tired wheel comprising a base, a main wheel-holder or rim-holder plate or table, said table being supported by said base and defining at least three slide tracks or guides, at least three jaws or jaw or gripper components, each slidably mounted in a respective slide track or guide between at least one first approached position and at least one second moved-apart position, said jaw components being set to tighten a respective portion of a rim of or for a tired wheel in said at least one first approached position and/or in said at least one second moved-apart position, wherein said group comprises at least three actuators, each constrained or pivoted to a respective jaw component and set to move it between said at least one first and said at least one second position, said group for tightening further comprising means for synchronizing the movement of said at least three jaw components, said synchronization means being set to maintain said at least three jaw components at a same distance with respect to the center of said table, such that said jaw components apply the same tightening force to a respective portion of a rim mounted on said table, wherein said actuators are angularly movable with respect to said table and wherein said synchronization means are set to maintain said at least three actuators always in the same angular position with respect to each other, during the movement by said at least three actuators of said at least three jaw components between said at least one first and said at least one second position.

2. The group for tightening according to claim 1, wherein said synchronization means comprise a frame pivoted to said table, while said actuators are fixed to said frame.

3. The group according to claim 2, wherein said frame is centrally pivoted to said table.

4. The group according to claim 2, wherein each of said actuators comprises a cylinder as well as a stem slidably mounted within the respective cylinder and wherein the cylinders or the stems of said actuators are cantileverly supported by said frame.

5. The group according to claim 1, wherein the stems or the cylinders of said actuators are pivoted below a respective jaw component.

6. The group according to claim 1, wherein said synchronization means comprise connection means and wherein each of said actuators comprises a cylinder as well as a stem slidably mounted within the respective cylinder, the cylinders or the stems of said actuators being pivoted to said table, while the stems or the cylinders of said actuators are constrained to one another by means of said connection means.

7. The group according to claim 6, wherein said connection means include a main connection component as well as rod components set to kinematically connect the main connection component and said stems or said actuators.

8. The group according to claim 6, wherein said connection means comprise fork components or mechanical fixing components between said stems or said cylinders of said actuators.

9. The group according to claim 8, wherein said fork components or fixing components are set for constraining together at least two stems or cylinders, i.e. constraining or fixing the angular distance of the stems or of the cylinders.

10. The group according to claim 1, comprising three jaw components slidably mounted in slide tracks or guides that are angularly spaced by about 120° with respect to each other or four jaw components slidably mounted in slide tracks or guides that are angularly spaced by about 90° with respect to each other.

11. The group according to claim 1, wherein said actuators are pivoted with respect to said table and do not project with respect to the planar bulk of said at least one table or in any case do not increase the part of said actuators that is projecting with respect to the planar bulk of said table in the passage of said jaw components between said at least one first approached position and said at least one second moved-apart position.

12. The group according to claim 1, wherein at least one actuator is at a level or distance from said table that is different with respect to another actuator.

13. The group according to claim 12, wherein each of said actuators comprises a cylinder as well as a stem slidably mounted within the respective cylinder and wherein at least two stems of two respective actuators are staggered vertically or in any case according to a direction orthogonal to the main extension plane of said table, but crossed with reference to a plan view, i.e. the vertical plane where the extension direction of one of said stems lies intercepts the other of said two stems, such that the two stems can slide one over the other, in cross direction with respect to the other.

14. The group according to claim 1, wherein said table comprises a solid of revolution around a symmetry axis, said solid of revolution being configured as a substantially flat discoid element, said slide tracks or guides each being defined by a through slot formed in said discoid element, the slots of said slide tracks or guides extending along lines belonging to the bundle of lines with center in the symmetry axis of said substantially discoid element.

15. The group according to claim 1, comprising an actuator for each jaw component, such that all said jaws are driving, so that they can all simultaneously apply the same tightening force to a rim mounted on said table.

16. A tire mounting-demounting machine provided with a tightening group according to claim 1.

* * * * *